United States Patent Office 3,198,507
Patented Aug. 3, 1965

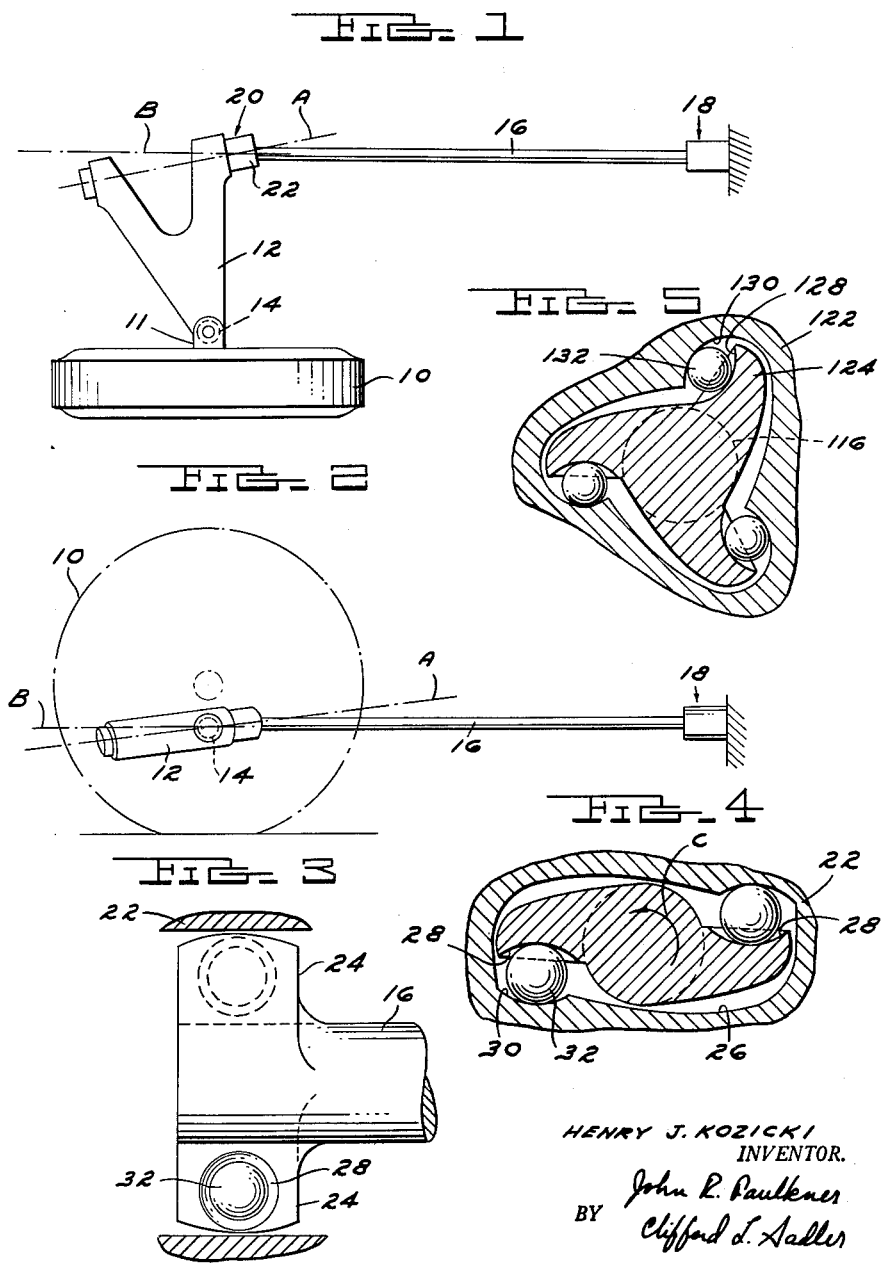

3,198,507
TORSION BAR CONNECTION
Henry J. Kozicki, Livonia, Mich., assignor to Ford Motor Company, Dearborn, Mich., a corporation of Delaware
Filed June 30, 1961, Ser. No. 121,061
2 Claims. (Cl. 267—57)

This invention relates to vehicle suspension systems and more particularly to a method for connecting a torsion bar spring between sprung and unsprung components in such a system.

In an automotive suspension system, torsion bar springs are usually secured to suspension arms and frame brackets by means of rigid attachment devices. A typical example of such construction is provided by forming a spline or hexagonal shape to the end of the torsion bar and fitting the formed end into a socket of complementary contour. The bar has considerable torsional preload and the attachment is therefore inflexible. Where the securement is rigid, the bar itself must bend to allow the suspension arm to move in any direction other than pure rotation about the center line of the bar.

For geometrical and space considerations, the center line of the suspension arm is usually offset at an angle to the center line of the torsion bar in both the plan and elevational views. It is evident that with a rigid connection when the arm rotates about its pivot axis during vertical wheel travel, the bar must bend or bow because the socket receiving the bar end is rotating about the pivot axis of the arm rather than about the center line of the bar.

In certain modern vehicle suspension systems, the wheel support structure is designed to have slight flexibility in a fore and aft direction to permit absorption of minor road shocks. This horizontal wheel movement is known as wheel compliance or wheel recession and results in a substantial reduction of harshness and improvement of ride. In a vehicle suspension system having compliance type construction, a rigid connection between the torsion bar end and the suspension arm will cause considerable resistance to the desired horizontal movement of the suspension arm. Thus, horizontal movement of the arm is compromised by the resistance of the bar to bending.

An additional objection to a rigid connection between the bar and the arm is that it tends to corrode and rust under the action of road salt, mud and similar contaminants. Such action leads to premature failure of the torsion bar and makes disassembly difficult.

In view of the present state of the art, it is an object of this invention to provide in a torsion bar suspension system an improved end connection construction to eliminate the introduction of bending moments into the bar.

More specifically, the present invention provides a vehicle suspension system having a torsion bar connected to a suspension arm by a universal type coupling. The bar end has a pair of radial ears and the suspension arm is provided with an oblong socket into which the torsion bar end is fitted. Ball members are positioned between the ears and the sockets to complete the connecting device.

Therefore, it is a further object of the present invention to provide a ball-type coupling for a torsion bar end which permits misalignment of the bar and the socket during vertical wheel travel without introducing a bending moment into the bar.

These and other objects of this invention will be more fully comprehended from the following description and the accompanying drawings in which:

FIGURE 1 is a top plan view of a vehicle suspension system incorporating the present invention;

FIGURE 2 is a side elevational view of the construction of FIGURE 1;

FIGURE 3 is a detailed plan view of the end attachment;

FIGURE 4 is a sectional view taken along section lines 4—4 of FIGURE 3; and

FIGURE 5 is a modification of the attachment of FIGURES 3 and 4.

Referring now to the drawings wherein the presently preferred embodiments are disclosed, FIGURE 1 presents an automotive type independent front suspension system having a vehicle wheel 10 rotatably mounted on a spindle 11 that in turn is secured to a pivotally mounted suspension arm 12 by a ball and socket joint 14 of well-known construction.

The inner end of the arm 12 is pivotally secured to a vehicle chassis (not shown) and has an axis of rotation indicated by the dash-dot line A. For purposes of the present discussion, the suspension arm 12 constitutes the lower arm of an independent suspension system, however, this invention is also appropriate to other instances where a torsion bar end is secured in position.

A torsion bar spring 16 is provided to elastically support the vehicle chassis on the wheel 10. The spring 16 is secured by a bracket 18 to an appropriate component of the chassis such as a cross-frame member. The forward end of the bar 16 is seated at 20 in a socket 22 carried by the suspension arm 12. It is to be noted that the torsion bar 16 has a center line indicated by the dot-dash line B.

In both the plan view, FIGURE 1, and side elevational view, FIGURE 2, the center line B of the torsion bar 16 does not coincide with the pivot axis A of the suspension arm 12. This is a typical suspension situation. As a result, a bending moment will be introduced into the bar 16 as the arm 12 oscillates about the axis A, that is, a moment will be introduced unless appropriate means are provided. In accordance with the present invention, such means include a torsion bar 16 having an end with a pair of radially extending ear portions 24. The socket 22 is broached to have an oblong internal contour 26 to complement the general configuration of the radially extending ears 24.

More specifically, the ears 24 have saucer-like recesses 28. Correspondingly, the internal portion 26 of the socket 22 has saucer-like recesses 30. Interposed between each pair of recesses 28 and 30 is a ball 32. It is noted that the radius of the recesses 28 and 30 is considerably greater than the radius of the ball 32.
ball 32.

Due to the considerable torque that is preloaded into the torsion bar 16, pressure is constantly present keeping the balls 32 in place. This torque is indicated by the arcuate arrow C.

The described construction provides a ball and socket type coupling permitting substantial misalignment between the torsion bar 16 and the socket 22. The torque in the bar 16 is never reversed and always maintains a pressure upon the balls 32. The recess surfaces 28, 30 are appropriately curved to accommodate the various conditions of misalignment and to hold the compressive stresses to acceptable limits.

When the socket 22 and end of the torsion bar 16 misalign, the balls 32 roll and climb up the curved surfaces 28, 30 slightly to accommodate the misalignment. It is noted that misalignment is permitted in all directions, making the coupling a universal joint. Tolerances in the vehicle's longitudinal direction resulting from commercial construction practices are also accommodated by this socket construction. The torque in the bar 16 maintains the balls in position, as previously stated, however, a retainer device may be provided during the assembly of the coupling 20.

FIGURE 5 illustrates a modified connection in which a socket 122 receives a torsion bar 16 having three radially extending ears 124. These ears are fitted with recesses 128 and the socket 122 has similar saucer-like recesses 130. A ball 132 is fitted between each of the ears 24 and saucers 130. The type of coupling shown in FIGURE 5 functions in an identical fashion to the couplings disclosed in FIGURES 3 and 4. The three ear type of construction permits slightly smaller balls and a slightly reduced overall diameter.

Other modifications and alterations of this invention may occur to those skilled in the art which will come within the scope and spirit of the following claims.

I claim:
1. A vehicle having sprung and unsprung components, a pivotally mounted suspension arm interconnecting said components, a torsion bar spring connected at one of its ends to said sprung components, a socket member secured to said arm and having a plurality of radially extending relieved portions, the other end of said torsion bar having radially extending ear portions fitted into said relieved portions, spherical driving members interposed between said relieved portions and said ear portions, the connection of said arm with said sprung components having a pivot axis, said other end of said torsion bar having an axis of rotation, said axes being angularly offset with respect to each other.

2. A vehicle having sprung and unsprung components, a pivotally mounted suspension arm interconnecting said components, a torsion bar spring connected at one of its ends to said sprung components, a socket member secured to said arm and having a plurality of radially extending relieved portions, the other end of said torsion bar having radially extending ear portions fitted into said relieved portion, spherical driving members interposed between said relieved portions and said ear portions, the pivot axis of the connection between said suspension arm and said sprung components being arranged to pass through the approximate center of said socket member.

References Cited by the Examiner
UNITED STATES PATENTS 2,998,241   4/61   Eyb ------------------ 267—57

FOREIGN PATENTS 295,563   3/54   Switzerland.
446,985   5/36   Great Britain.
870,050   3/53   Germany.

ARTHUR L. LA POINT, *Primary Examiner.*

RICHARD A. DOUGLAS, ROBERT C. RIORDON,
*Examiners.*